United States Patent
Patychuk et al.

(10) Patent No.: US 11,292,481 B2
(45) Date of Patent: Apr. 5, 2022

(54) METHOD AND APPARATUS FOR MULTI VEHICLE SENSOR SUITE DIAGNOSIS

(71) Applicant: GM GLOBAL TECHNOLOGY OPERATIONS LLC, Detroit, MI (US)

(72) Inventors: Bronson D. Patychuk, Ontario (CA); Matthew G. Adams, Ontario (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 343 days.

(21) Appl. No.: 16/567,322

(22) Filed: Sep. 11, 2019

(65) Prior Publication Data
US 2021/0070311 A1 Mar. 11, 2021

(51) Int. Cl.
*B60W 50/02* (2012.01)
*G07C 5/00* (2006.01)
*B60W 50/035* (2012.01)
*G05D 1/02* (2020.01)

(52) U.S. Cl.
CPC ...... *B60W 50/0205* (2013.01); *B60W 50/035* (2013.01); *G07C 5/008* (2013.01); *B60W 2050/0215* (2013.01); *B60W 2420/52* (2013.01); *B60W 2556/60* (2020.02); *G05D 1/0231* (2013.01)

(58) Field of Classification Search
CPC ........... B60W 50/0205; B60W 50/035; B60W 2556/60; B60W 2050/0215; B60W 2420/52; G07C 5/008; G05D 1/0231
USPC ........................................ 701/29.2
See application file for complete search history.

(56) References Cited

U.S. PATENT DOCUMENTS

| 10,026,239 | B2 | 7/2018 | Kim et al. |
| 2018/0336297 | A1 | 11/2018 | Sun et al. |
| 2019/0249999 | A1* | 8/2019 | Agarwal ................ G01C 21/34 |
| 2019/0329778 | A1* | 10/2019 | D'sa .................. B62D 15/0255 |

\* cited by examiner

*Primary Examiner* — Gertrude Arthur Jeanglaude
(74) *Attorney, Agent, or Firm* — Lorenz & Kopf LLP

(57) ABSTRACT

The present application relates to a method and apparatus for multi vehicle sensor suite diagnosis in a motor vehicle including a receiver operative to receive a remote vehicle sensor data indicative of a location of a target, a sensor operative to collect a host vehicle sensor data indicative of the location of the target, a processor operative to generate a sensor confidence score in response to a comparison of the first remote vehicle sensor data and the host vehicle sensor data, the processor being further operative to perform an assisted driving operation in response to the sensor confidence score, and a transmitter for transmitting the host vehicle sensor data and the sensor confidence score to a first remote vehicle.

20 Claims, 5 Drawing Sheets

METHOD AND APPARATUS FOR MULTI VEHICLE SENSOR SUITE DIAGNOSIS

BACKGROUND

The present disclosure relates generally to programming motor vehicle control systems. More specifically, aspects of this disclosure relate to systems, methods and devices for diagnosing perception sensors by exchanging and comparing sensor information between vehicles over aggregate measurements.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Vehicles equipped with ADAS systems require sensors such as Lidar, Radar, cameras and image processing algorithms, to detect objects and the environment around the vehicle. Vehicle control systems performing higher level vehicle automation functions depend on accurate data from these sensors to avoid vehicle incidents, vehicle damage, and efficient performance. As sensors age and sensor materials become affected by weather and other factors they become less accurate and require recalibration to provide accurate measurements. Comparing multiple sensors on the same vehicle may be problematic as all sensors have aged equally and may have been subject to the same external conditions. Bring a vehicle into a repair facility may be inconvenient for a vehicle operator and may be delayed for this and other reasons. It would be desirable to overcome these problems to provide a method and apparatus for vehicle sensor suite diagnosis and calibration for use in ADAS equipped vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a receiver operative to receive a remote vehicle sensor data indicative of a location of a target, a sensor operative to collect a host vehicle sensor data indicative of the location of the target, a processor operative to generate a sensor confidence score in response to a comparison of the first remote vehicle sensor data and the host vehicle sensor data, the processor being further operative to perform an assisted driving operation in response to the sensor confidence score, and a transmitter for transmitting the host vehicle sensor data and the sensor confidence score to a first remote vehicle.

In accordance with another aspect of the present invention wherein the target is a second remote vehicle.

In accordance with another aspect of the present invention wherein the transmitter is operative to transmit the host vehicle sensor data and the sensor confidence score to a second remote vehicle.

In accordance with another aspect of the present invention wherein the receiver is operative to receive a remote vehicle sensor confidence score and wherein the sensor confidence score is refined in response to the remote vehicle sensor confidence score.

In accordance with another aspect of the present invention wherein the sensor includes a lidar system.

In accordance with another aspect of the present invention wherein the processor is operative to disable an advanced driving assistance system in response to the sensor confidence score being below a predetermined value.

In accordance with another aspect of the present invention wherein the receive is further operative to receive a first remote vehicle location and wherein the remote vehicle sensor confidence score is transposed relative from the first remote vehicle location to relative from the host vehicle location.

In accordance with another aspect of the present invention including a global positioning system for measuring a location of a host vehicle.

In accordance with another aspect of the present invention method including receiving, via a wireless receiver, a remote vehicle sensor data indicative of a location of a target, determining, in response to a sensor output, a host vehicle sensor data indicative of the location of the target, generating a sensor confidence score using a processor in response to a comparison of the first remote vehicle sensor data and the host vehicle sensor data, performing, with a vehicle controller, an assisted driving operation in response to the sensor confidence score, and transmitting, via a wireless transmitter, the host vehicle sensor data and the sensor confidence score to a first remote vehicle.

In accordance with another aspect of the present invention wherein the target is a second remote vehicle.

In accordance with another aspect of the present invention wherein the wireless transmitter is operative to transmit the host vehicle sensor data and the sensor confidence score to a second remote vehicle.

In accordance with another aspect of the present invention wherein the wireless receiver is operative to receive a remote vehicle sensor confidence score and wherein the sensor confidence score is refined in response to the remote vehicle sensor confidence score.

In accordance with another aspect of the present invention wherein the host vehicle sensor data is determined by a lidar system.

In accordance with another aspect of the present invention further including disabling an advanced driving assistance system in response to the sensor confidence score being below a predetermined value.

In accordance with another aspect of the present invention wherein the wireless receiver is further operative to receive a first remote vehicle location and wherein the remote vehicle sensor confidence score is transposed relative from the first remote vehicle location to relative from the host vehicle location.

In accordance with another aspect of the present invention including measuring a location of a host vehicle with a global positioning system.

In accordance with another aspect of the present invention wherein the target is a static target and the location of the target is indicated by a longitude coordinate and a latitude coordinate.

In accordance with another aspect of the present invention including generating an operator warning in response to the sensor confidence score being below a predetermined value.

In accordance with another aspect of the present invention, an advanced driver assistance system for controlling a host vehicle including a transceiver for receiving a first object location and a remote sensor confidence score from a first remote vehicle and for transmitting a second object location and a host sensor confidence score to the first remote vehicle, a processor for comparing the first object location and the second object location to generate the host sensor confidence score, wherein the host sensor confidence score is determined in response to a difference between the first object location and the second object location and the remote sensor confidence score, and a vehicle controller for enabling an assisted driving function in response to the host sensor confidence score exceeding a threshold value.

In accordance with another aspect of the present invention wherein the first object location is a target location detected by a remote sensor located in the first remote vehicle and the second object location is the target location detected by a host sensor located in the host vehicle.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
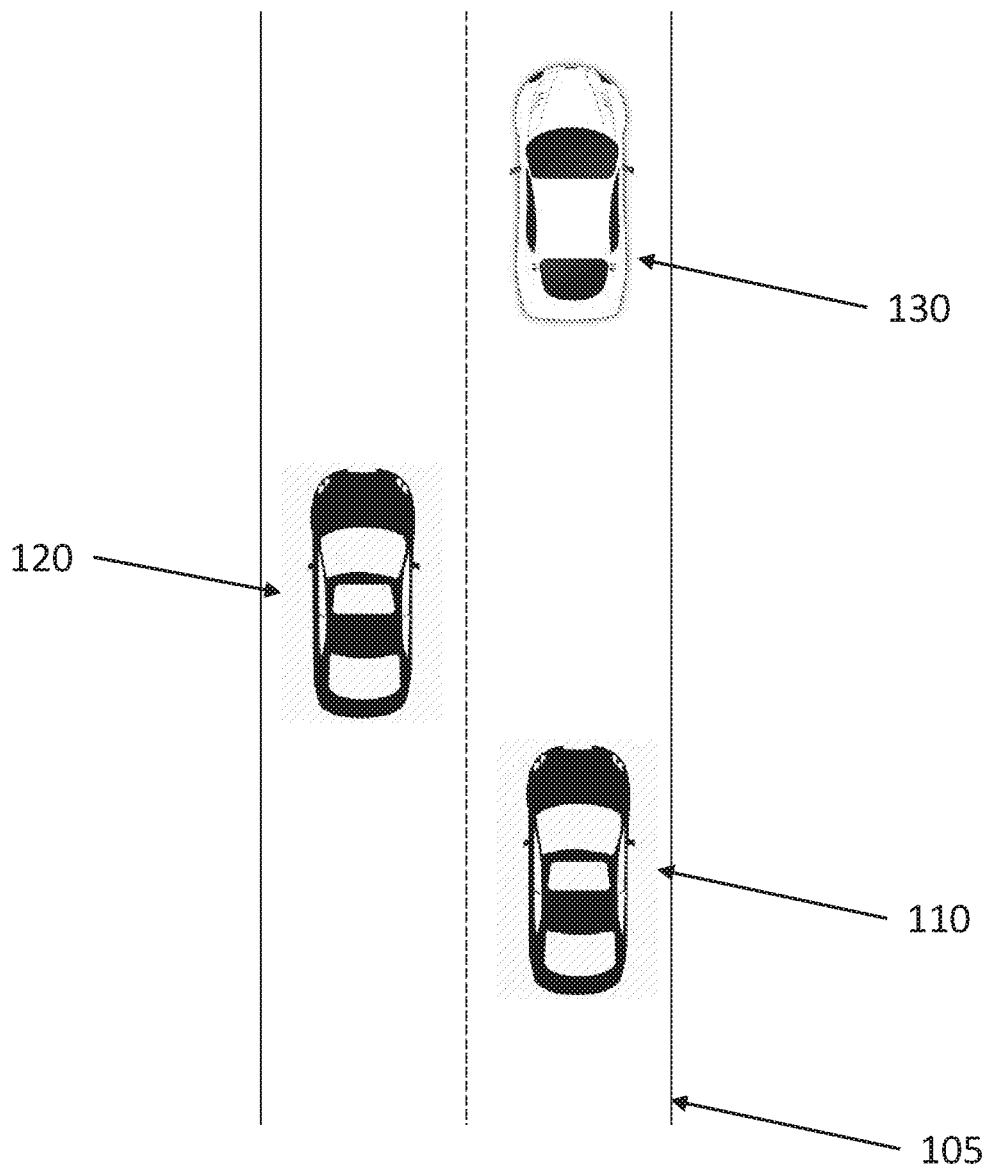
FIG. 1 shows an operating environment for multi vehicle sensor suite diagnosis in a motor vehicle according to an exemplary embodiment.

FIG. 1 schematically illustrates an operating environment 100 for multi vehicle sensor suite diagnosis in a motor vehicle 110. In this exemplary embodiment of the present disclosure, the host vehicle 110 is driving on a multilane roadway 105. In this exemplary embodiment, the host vehicle 110 is equipped with various sensors and a vehicle to vehicle (V2V) communications system. Proximate to the host vehicle 110, travelling on the multilane roadway 105, is a first vehicle 120 equipped with a V2V communications system and a second vehicle 130.

The proposed method and apparatus are operative to diagnose perception sensors in V2V equipped vehicles by exchanging and comparing sensor information between vehicles, The diagnosis may be refined over aggregate measurements between multiple vehicles. The method is operative to use perception data from multiple vehicles to diagnose sensor suite health for each vehicle and aggregates device confidence and historic performance of participating vehicles to improve cross vehicle object detection robustness. The system and method provide diagnostic coverage for sensor degradation, prognosis of failures, and quantifies long term trending of degradation to provide robustness to cross vehicle perception and allow control use cases to leverage data confidently; feature availability, and better control decisions. For example, V2V equipped vehicles may compare GPS localization data, compare traffic indicator detection data, such as a red traffic light and perceived location of pedestrians and vehicles. Vehicle control systems may then change control strategies if the host vehicle perceptions differ from that of proximate vehicles.

In an exemplary embodiment, the host vehicle 110 and the first vehicle 120 may be first operative to establish a V2V communications connection. The first vehicle 120 and the host vehicle may then establish a location and heading coordination between the vehicles. The first vehicle 120 may then transmit camera and radar perception data relating to the second vehicle 130 to the host vehicle 110. Using relative location and heading information, the host vehicle 110 then compares the received perception data to perception data detected by the host vehicle 110 relating to the second vehicle 130. The host vehicle 110 may then establish a vehicle sensor score in response to the comparison and determine if further corrective action to the sensor suite is required. The host vehicle 110 may then transmit this score back to the first vehicle 120. The host vehicle 110 and the first vehicle 120 may aggregate the scores from exchanges with multiple vehicles to establish a sensor score confidence.

Figure 2:
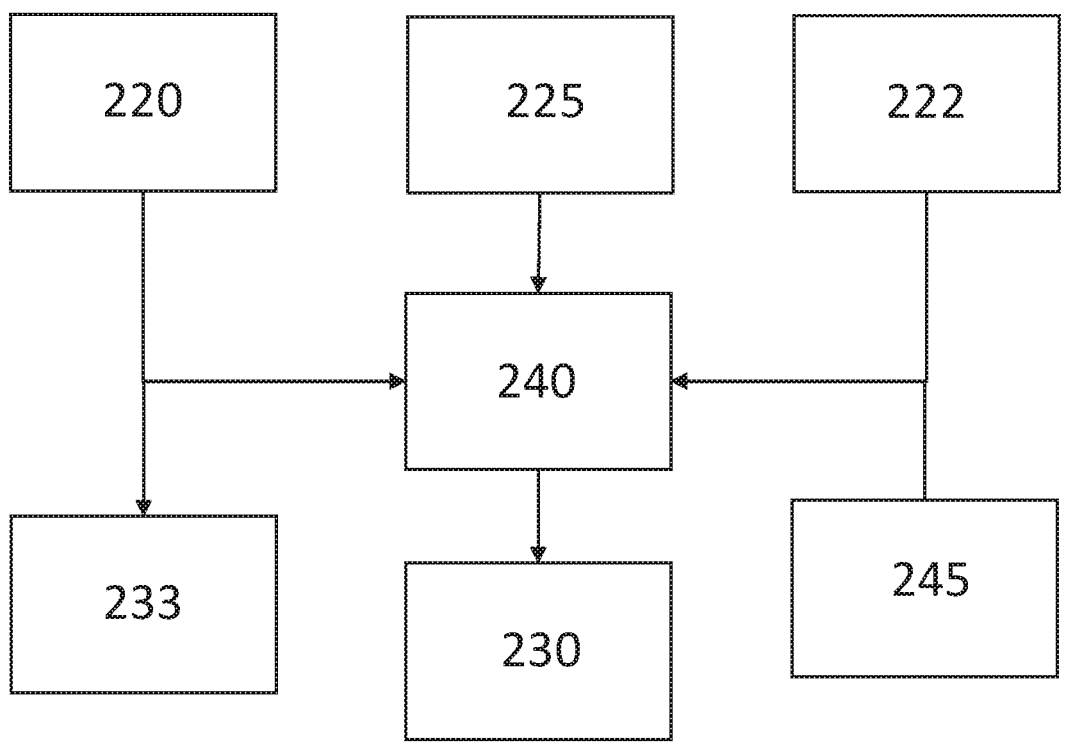
FIG. 2 shows a block diagram illustrating a system for multi vehicle sensor suite diagnosis in a motor vehicle according to an exemplary embodiment.

Turning now to FIG. 2, a block diagram illustrating an exemplary implementation of a system 200 for multi vehicle sensor suite diagnosis in a motor vehicle is shown. The exemplary system 200 includes a processor 240, a camera 220, a Lidar 222, a global positioning system (GPS) 225, a transceiver 233, a memory 245, and a vehicle controller 230.

During ADAS operation, the system 200 is operative to use various sensors such as a camera 220, GPS 225 and Lidar 222 capable of identifying vehicle location, locating roadway markers, proximate vehicles and other external objects. Sensor fusion algorithms provides accurate tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. The identification and location of these objects and the surrounding environment may facilitate the creation of a three dimensional object map by the ADAS in order to control the vehicle in the changing environment.

The Lidar 222 is operative to generate a laser beam, transmit the laser beam into the FOV and capture energy reflected from a target. The Lidar 222 may employ time-of-flight to determine the distance of objects from which the pulsed laser beams are reflected. The oscillating light signal is reflected from the object and is detected by the detector within the Lidar 222 with a phase shift that depends on the distance that the object is from the sensor. An electronic phase lock loop (PLL) may be used to extract the phase shift from the signal and that phase shift is translated to a distance by known techniques.

The Lidar 222 may be employed as a sensor on the host vehicle to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

The transceiver 233 is operative to transmit and receive data via a wireless network to other vehicles, infrastructure, or remote computer systems. According to an exemplary embodiment of the present disclosure, the transceiver may be operative to transmit vehicle location data determined in response to the GPS 225 output, vehicle velocity, acceleration and the like estimated in response to inertial measurement unit (IMU) sensor data, Lidar 222 and/or camera 220 perception data, data generated in response to sensor fusion algorithms, and the like. The transceiver 233 may be further operative to receive similar data from other vehicles via a V2V communications network as well as confidence values related to the transmitted and received data.

In an exemplary embodiment, the processor 240 is operative to receive a sensor data from a vehicle sensor, such as the Lidar 222, indicative of a location of an object within the FOV, such as the location of a pedestrian. The processor 240 is then operative to receive a data from another vehicle via the transceiver indicative of a location of the pedestrian. This data may include the location of the remote vehicle wherein the location of the pedestrian is relative to the remote location and therefore the pedestrian location must be transposed to be relative to the host vehicle location. The processor 240 is then operative to compare the two pedestrian location detections and to generate a sensor confidence score in response to a difference between the two. The processor may then be operative to transmit the host vehicle's measured pedestrian location, the host vehicle location and the confidence score to the remote vehicle for refinement of the remote vehicle's sensor confidence score. This process may be repeated with multiple remote vehicles to further refine the sensor confidence scores and to generate an aggregate confidence score. In response to a low sensor confidence score, the processor 240 may be operative to restrict use of an ADAS algorithm or may generate a user warning indicative of a sensor failure or the like. High confidence sensor score sensor data may be coupled to a vehicle controller for use by the ADAS. The sensor score for each sensor may be stored in the memory 245.

The vehicle controller 230 may generate control signals for coupling to other vehicle system controllers, such as a throttle controller, a brake controller and a steering controller in order to control the operation of the vehicle in response to the ADAS algorithm in response to a sensor output, such as a depth map generated in response to the lidar 222 output. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
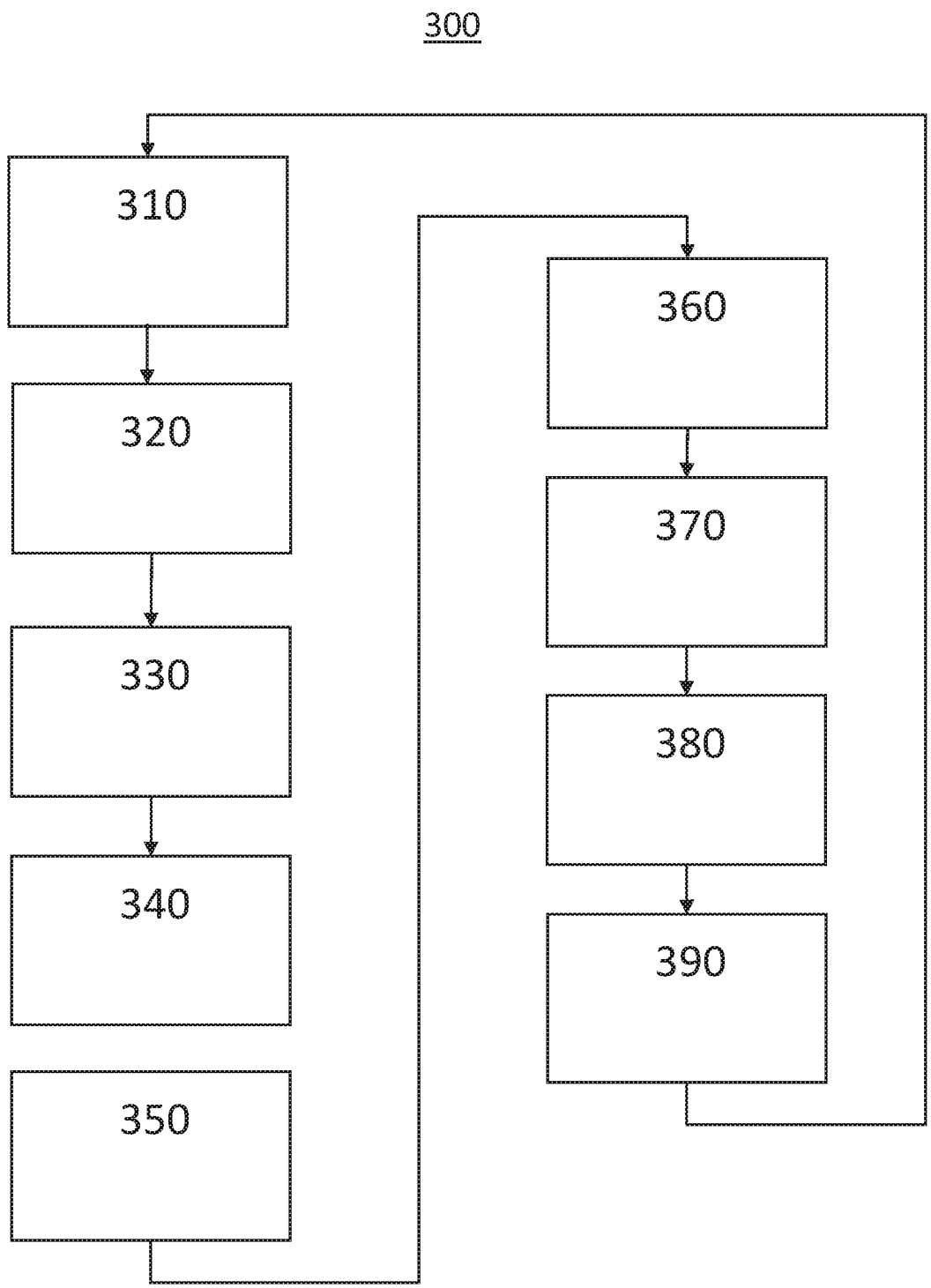
FIG. 3 shows a flow chart illustrating a method for multi vehicle sensor suite diagnosis in a motor vehicle according to another exemplary embodiment.

Turning now to FIG. 3, a flow chart illustrating an exemplary implementation of a method 300 for multi vehicle sensor suite diagnosis in a motor vehicle is shown. The method is first operative to generate 310 a measured host vehicle sensor data using a vehicle sensor. The measured host vehicle sensor data may be detected in response to a lidar, radar, camera image or other sensor for detecting an environment around the host vehicle. The measured host vehicle sensor data may be generated in response to a location measure by a GPS sensor and/or velocity and acceleration measurements by an inertial measurement unit.

The method is next operative to receive 320 a first remote vehicle sensor data and a first remote vehicle location via a V2V communication from a first remote vehicle. The first remote vehicle sensor data and the first remote vehicle location can be exchanged between the host vehicle and the first remote vehicle via a V2V communications network. The two vehicles may establish a V2V communications link via dedicated short-range communications transceivers typically in the 5.9 GHz band.

The method is next operative to calculate 330 a first estimated host vehicle sensor data in response to the first remote vehicle sensor data and the first remote vehicle location. The first remote vehicle sensor data is received by the first remote vehicle at the first remote vehicle location. For an accurate comparison of the first remote vehicle sensor data to be made with host vehicle data, the first remote vehicle sensor data may be mathematically transposed to the host vehicle location. This transposition operation is used to generate the first estimated host vehicle sensor data, which is a sensor data estimated in response to the measured first remote vehicle sensor data.

The method is next operative to calculate 340 a sensor confidence score in response to a comparison between the measured host vehicle sensor data and the first estimated host vehicle sensor data. The sensor confidence score may be determined based on a difference between the two sets of data. In addition, the first remote sensor data may further include an aggregated sensor score from the first remote vehicle indicating a relative confidence of the first remote vehicle sensor accuracy. For example, if the first remote sensor data has a high sensor score and the host vehicle sensor data differs from the first remote sensor data, the host sensor may receive a lower sensor score as the measurement differs with a sensor measurement with a high accuracy confidence. As sensor scores and sensor data are exchanged between multiple vehicles, the host vehicle aggregated score may provide a clearer indication of the host sensor accuracy.

The method may then transmit 350 the sensor score, the measured host vehicle sensor data, and a host vehicle location to the first remote vehicle. This data may be used by the first remote vehicle to refine the first remote sensor score. The method may then receive 360 a second remote vehicle sensor data and a second remote vehicle location from a second remote vehicle, calculate 370 a second estimated host vehicle sensor data in response to the second remote vehicle sensor data and the second remote vehicle location in order to refine 380 the sensor score in response to the second estimated host vehicle sensor data and the measured host vehicle data. The refined sensor score is used to increase the confidence in the accuracy of the sensor score which may be skewed by a few inaccurate sensor data comparisons. The method is then operative to transmit 390 the refined sensor score, the measured host vehicle data and the host vehicle location to the second remote vehicle to be used by the second remote vehicle to refine the second remote sensor score. This method may be repeated with multiple remote vehicles and sensor data from different vehicle sensor types in order to increase an aggregate confidence in a sensor accuracy.

In an exemplary embodiment, data for an individual sensor state of health may be transmitted and received via the V2V transmission. A confidence on an individual measurement may then be made and then aggregated at a vehicle level including past performance. Confidence on an instantaneous measurement and a sensor system performance may be used for the vehicle self-diagnosed sensor status. This aggregated vehicle sensor score may be transmitted for each of the different sensing technologies or each of the sensors. Thus, different scores may be generated for different sensing technologies. For example, in a vehicle system including a Lidar, a radar, and a GPS, individual scores may be generated for each sensing technology and transmitted to proximate vehicles. The comparison results may be grouped by applicable sensors. In response to the received comparison results an adjustment to the scoring may be made based on the current vehicle sensor score, the expectation of perceiving the same data and other vehicle sensor scores and confidence levels.

Figure 4:
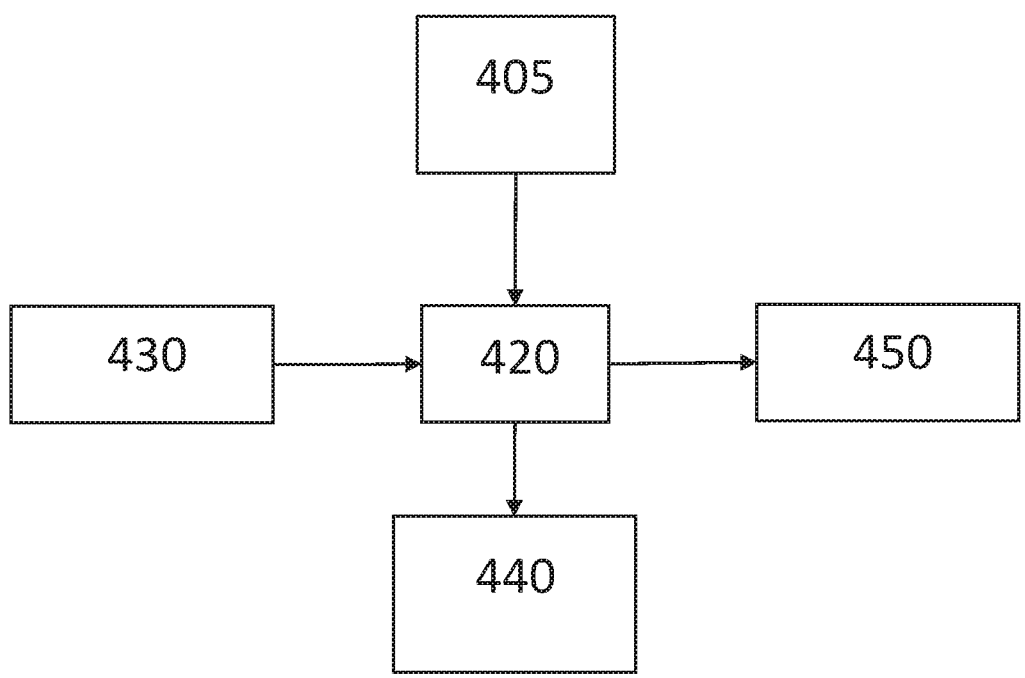
FIG. 4 shows a block diagram illustrating a system for multi vehicle sensor suite diagnosis in a motor vehicle according to another exemplary embodiment.

Turning now to FIG. 4, a block diagram illustrating another exemplary implementation of a system 400 for multi vehicle sensor suite diagnosis in a motor vehicle is shown. The system may be an advanced driver assistance system for controlling a host vehicle having a receiver 410, a processor 420, a sensor 430, a transmitter 450 and a vehicle controller 440. The exemplary sensor 430 is operative to determine a location of an object within the sensor field of view. The sensor 430 may be one sensor, such as a lidar or radar, or may be an array of similar sensors, such as a lidar array with multiple lidar transmitter and detectors or a plurality of sensors using a sensor fusion algorithm operative to combine the various outputs of the various sensors into a single object map or the like. In this exemplary system, the sensor 430 is operative to detect a host vehicle sensor data indicative of the location of a target, such as a proximate vehicle, pedestrian, or static object.

This exemplary system 400 further includes a receiver 405 operative to receive a remote vehicle sensor data indicative of a location of a target and a transmitter 450 for transmitting a host vehicle sensor data and a sensor confidence score to a first remote vehicle. In an additional exemplary embodiment, the transmitter may be operative to transmit the host vehicle sensor data and the sensor confidence score to a second remote vehicle and the receiver may be operative to receive a remote vehicle sensor confidence score and wherein the sensor confidence score is refined in response to the remote vehicle sensor confidence score. Additionally, the receiver 405 may be operative to receive a first remote vehicle location and remote vehicle sensor confidence score wherein the remote vehicle sensor confidence score is transposed relative from the first remote vehicle location to relative from the host vehicle location.

The exemplary system further includes a processor 420 operative to generate a sensor confidence score in response to a comparison of the first remote vehicle sensor data and the host vehicle sensor data, the processor being further operative to perform an assisted driving operation in response to the sensor confidence score. The processor may further be operative to enable or disable an ADAS function in response to the sensor confidence score. For example, the processor may be operative to disable an ADAS function, such as lane centering, in response to the sensor confidence score being below a predetermined confidence value. The system may include a vehicle controller 440 for controlling a vehicle performing an ADAS function in response to the sensor confidence score. A GPS may be provided for determining a location of the host vehicle.

Figure 5:
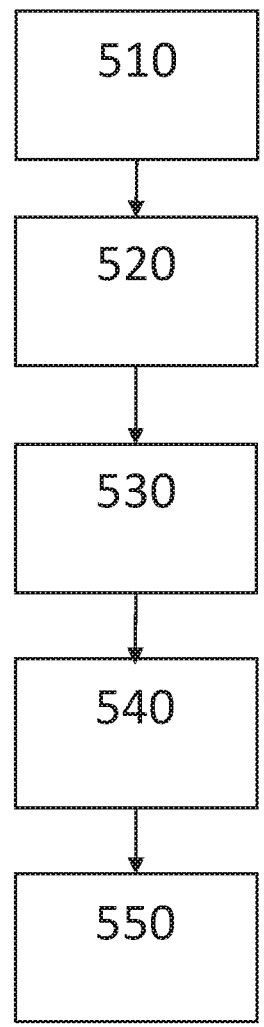
FIG. 5 shows a flow chart illustrating a method for multi vehicle sensor suite diagnosis in a motor vehicle according to another exemplary embodiment.

Turning now to FIG. 5, a flow chart illustrating an exemplary implementation of a system 500 for multi vehicle sensor suite diagnosis in a motor vehicle is shown. The exemplary method 500 is first operative to receive 510, via a wireless receiver, a remote vehicle sensor data indicative of a location of a target. In this exemplary method, the target may be a second remote vehicle. The target may be a static target and the location of the target is indicated by a longitude coordinate and a latitude coordinate such that the location of the target is relative to a geocentric coordinate system. The wireless receiver may be operative to receive a remote vehicle sensor confidence score from a first remote vehicle. In this exemplary embodiment, a previously calculated sensor confidence score may be refined in response to the remote vehicle sensor confidence score. The wireless receiver may alternatively be operative to receive a first remote vehicle location which is ego-centric to the remote vehicle location and wherein the remote vehicle sensor confidence score is transposed relative from the first remote vehicle location to relative from the host vehicle location.

The method is next operative for determining 520, in response to a sensor output, a host vehicle sensor data indicative of the location of the target. The sensor for generating the sensor output may be a lidar, radar, camera with image recognition capabilities or the like. The location may be generated relative to a geocentric coordinate system or an ego centric coordinate system relative to the host vehicle.

The method is next operative for generating 530 a sensor confidence score using a processor in response to a comparison of the first remote vehicle sensor data and the host vehicle sensor data. The sensor confidence score is generated in response to a difference between the remote vehicle determined location of the target and the host vehicle determined location of the target. A small variation in the two locations will result in a high sensor confidence score wherein a large deviation between the two locations may result in a lower sensor confidence score. The confidence score may further be determined in response to a first remote vehicle sensor confidence score and a previously determined host vehicle sensor confidence score.

The method may then perform 540 an assisted driving operation in response to the sensor confidence score. The method may alternatively, disable an ADAS in response to the sensor confidence score being below a predetermined value, or a user warning may be generated, such as a warning indicating a sensor failure, in response to the sensor confidence score being below a predetermined value. Finally, the method may be operative to transmit 550, via a wireless transmitter, the host vehicle sensor data and the sensor confidence score to a first remote vehicle. the wireless transmitter is operative to transmit the host vehicle sensor data and the sensor confidence score to a second remote vehicle. The sensor confidence score may be transmitted to a central office for aggregating confidence scores and/or object locations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
    a receiver operative to receive a remote vehicle sensor data indicative of a location of a target;
    a sensor operative to collect a host vehicle sensor data indicative of the location of the target;
    a processor operative to generate a sensor confidence score in response to a comparison of the remote vehicle sensor data and the host vehicle sensor data, the processor being further operative to perform an assisted driving operation in response to the sensor confidence score; and
    a transmitter for transmitting the host vehicle sensor data and the sensor confidence score to a first remote vehicle.

2. The apparatus of claim 1 wherein the target is a second remote vehicle.

3. The apparatus of claim 1 wherein the transmitter is operative to transmit the host vehicle sensor data and the sensor confidence score to a second remote vehicle.

4. The apparatus of claim 1 wherein the receiver is operative to receive a remote vehicle sensor confidence score and wherein the sensor confidence score is refined in response to the remote vehicle sensor confidence score.

5. The apparatus of claim 1 wherein the sensor is a lidar system.

6. The apparatus of claim 1 wherein the processor is operative to disable an advanced driving assistance system in response to the sensor confidence score being below a predetermined value.

7. The apparatus of claim 1 wherein the receive is further operative to receive a first remote vehicle location and wherein the remote vehicle sensor confidence score is transposed relative from the first remote vehicle location to relative from the host vehicle location.

8. The apparatus of claim 1 further including a global positioning system for measuring a location of a host vehicle.

9. A method comprising:
    receiving, via a wireless receiver, a remote vehicle sensor data indicative of a location of a target;
    determining, in response to a sensor output, a host vehicle sensor data indicative of the location of the target;
    generating a sensor confidence score using a processor in response to a comparison of the remote vehicle sensor data and the host vehicle sensor data;
    performing, with a vehicle controller, an assisted driving operation in response to the sensor confidence score; and
    transmitting, via a wireless transmitter, the host vehicle sensor data and the sensor confidence score to a first remote vehicle.

10. The method of claim 9 wherein the target is a second remote vehicle.

11. The method of claim 9 wherein the wireless transmitter is operative to transmit the host vehicle sensor data and the sensor confidence score to a second remote vehicle.

12. The method of claim 9 wherein the wireless receiver is operative to receive a remote vehicle sensor confidence score and wherein the sensor confidence score is refined in response to the remote vehicle sensor confidence score.

13. The method of claim 9 wherein the host vehicle sensor data is determined by a lidar system.

14. The method of claim 9 further including disabling an advanced driving assistance system in response to the sensor confidence score being below a predetermined value.

15. The method of claim 9 wherein the wireless receiver is further operative to receive a first remote vehicle location and wherein the remote vehicle sensor confidence score is transposed relative from the first remote vehicle location to relative from the host vehicle location.

16. The method of claim 9 further including measuring a location of a host vehicle with a global positioning system.

17. The method of claim 9 wherein the target is a static target and the location of the target is indicated by a longitude coordinate and a latitude coordinate.

18. The method of claim 9 further including generating an operator warning in response to the sensor confidence score being below a predetermined value.

19. An advanced driver assistance system for controlling a host vehicle comprising:
    a transceiver for receiving a first object location and a remote sensor confidence score from a first remote vehicle and for transmitting a second object location and a host sensor confidence score to the first remote vehicle;
    a processor for comparing the first object location and the second object location to generate the host sensor confidence score, wherein the host sensor confidence score is determined in response to a difference between the first object location and the second object location and the remote sensor confidence score; and
    a vehicle controller for enabling an assisted driving function in response to the host sensor confidence score exceeding a threshold value.

20. The advanced driver assistance system for controlling the host vehicle of claim 19 wherein the first object location is a target location detected by a remote sensor located in the first remote vehicle and the second object location is the target location detected by a host sensor located in the host vehicle.

* * * * *